US011663221B2

(12) United States Patent
Fries et al.

(10) Patent No.: US 11,663,221 B2
(45) Date of Patent: May 30, 2023

(54) METHOD FOR DYNAMIC DATA MINIMIZATION OF A DATA SET BY MEANS OF WHITELISTING

(71) Applicant: Siemens Healthcare GmbH, Erlangen (DE)

(72) Inventors: Steffen Fries, Baldham (DE); Ute Rosenbaum, Kempten (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 82 days.

(21) Appl. No.: 17/202,431

(22) Filed: Mar. 16, 2021

(65) Prior Publication Data

US 2021/0303580 A1 Sep. 30, 2021

(30) Foreign Application Priority Data

Mar. 26, 2020 (DE) ...................... 10 2020 203 951.8

(51) Int. Cl.
*G06F 16/2457* (2019.01)
*G06F 16/22* (2019.01)
*G06F 16/2455* (2019.01)

(52) U.S. Cl.
CPC .... *G06F 16/24573* (2019.01); *G06F 16/2228* (2019.01); *G06F 16/24564* (2019.01)

(58) Field of Classification Search
CPC ........... G06F 16/24573; G06F 16/2228; G06F 16/24564; G06F 16/25; G06F 16/213; G06F 21/6227; G16H 10/60
See application file for complete search history.

(56) References Cited

U.S. PATENT DOCUMENTS 7,168,025 B1 * 1/2007 Berkovich .......... G06F 16/2255
714/759
8,645,391 B1 * 2/2014 Wong ...................... G06F 16/80
707/758

(Continued)

OTHER PUBLICATIONS

Abouakil, Daniel et al: "Data Models for the Pseudonymization of DICOM Data"; Proceedings of the 44th Hawaii International Conference on System Sciences—2011; recherchiert am Nov. 30, 2020; Im Internet: <URL: https://www.computer.org/csdl/proceedingsarticle/hicss/2011 /05718686/12OmNzVXNNc>.

(Continued)

*Primary Examiner* — Richard L Bowen
*Assistant Examiner* — Aryan D Toughiry
(74) *Attorney, Agent, or Firm* — Harness, Dickey & Pierce, P.L.C.

(57) ABSTRACT

A computer-implemented method is for dynamic data minimization of a data set for transfer of the minimized data set from a central instance to outside of the central instance, the data set including a second set of individual attributes. The method includes provisioning a whitelist including a first set of attributes being a subset of a second set of attributes. The minimized data set includes the first set of attributes. The method further includes determining an attribute list including a third set of attributes, the third set of attributes including at least the complement of the first set of attributes in relation to the second set of attributes. The method also includes provisioning the attribute list by the central instance for use outside of the central instance.

16 Claims, 8 Drawing Sheets

(56) References Cited

U.S. PATENT DOCUMENTS

| | | | |
|---|---|---|---|
| 2003/0218630 A1* | 11/2003 | Rutledge | G16H 10/60 |
| | | | 715/738 |
| 2013/0073532 A1* | 3/2013 | Bachar | G06F 9/52 |
| | | | 707/704 |
| 2016/0147940 A1 | 5/2016 | Flint | |
| 2016/0147955 A1* | 5/2016 | Shah | G16H 40/20 |
| | | | 705/2 |
| 2020/0145423 A1* | 5/2020 | Singh | H04L 63/0245 |
| 2021/0336876 A1* | 10/2021 | Huang | H04L 47/2483 |

OTHER PUBLICATIONS

Do pictures sent on WhatsApp keep their EXIF data_—Quora (Stand: 15.03.21): https://www.quora.com/Do-pictures-sent-on-WhatsApp-keep-their-EXIF-data.
Contentfilter—Wikipedia (Stand:01.04.19): https://web.archive.org/web/20190401003656/https://de.wikipedia.org/wiki/Contentfilter.
Fotos-Einstellungen auf dem Mac—Apple Support (Stand:19.03.18): https://web.archive.org/web/20180319212237if_/https://support.apple.com/de-de/guide/photos/pht5156cc968/mac.
Application firewall—Wikipedia (Stand:24.02.2019): https://web.archive.org/web/20190224033124/https://en.wikipedia.org/wiki/Application_firewall.
German Office Action dated Dec. 2, 2020.

\* cited by examiner

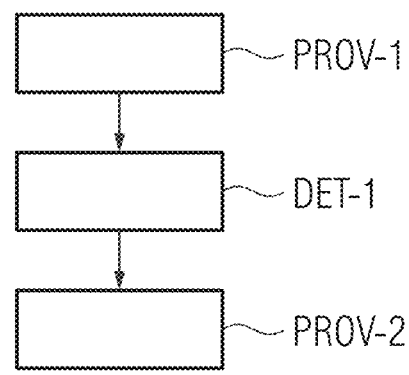
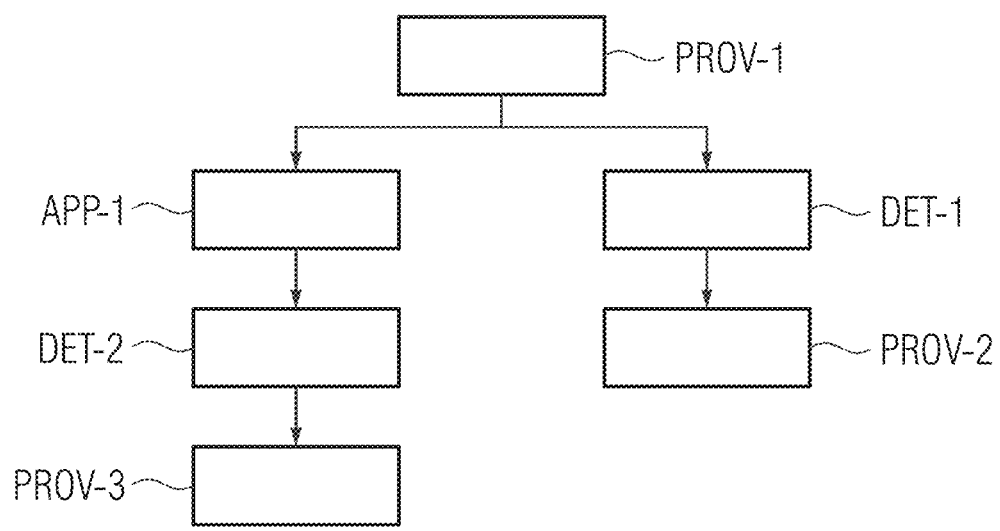

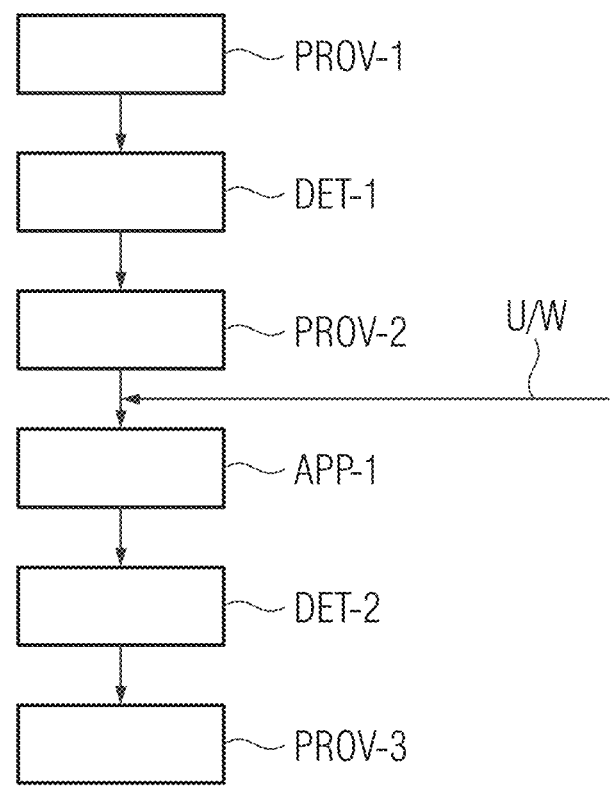

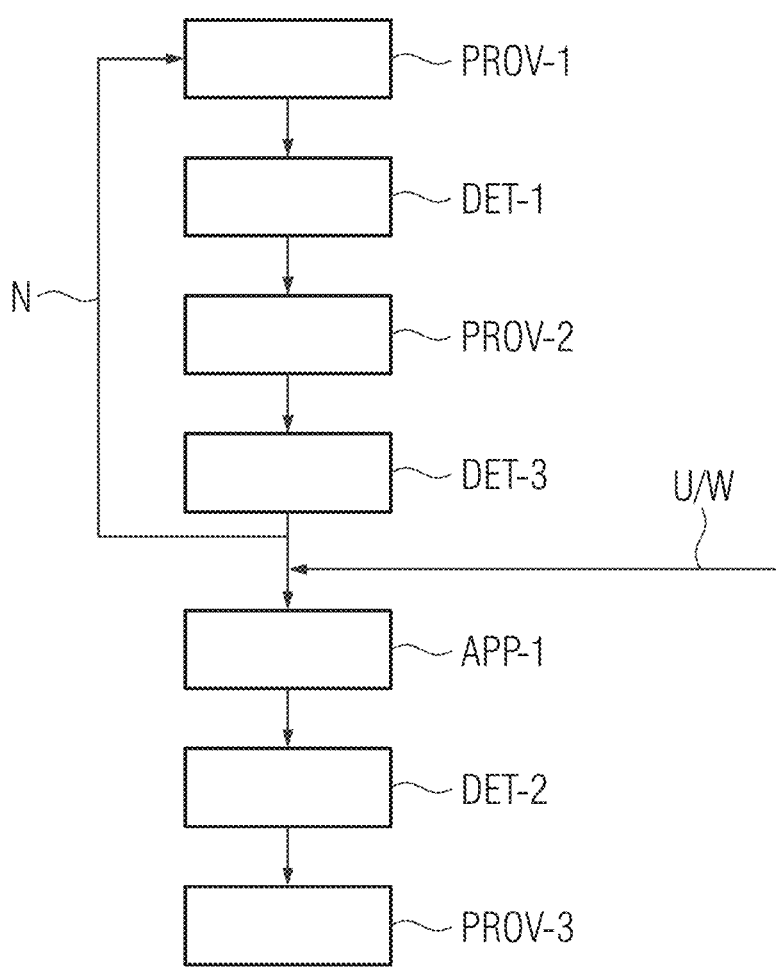

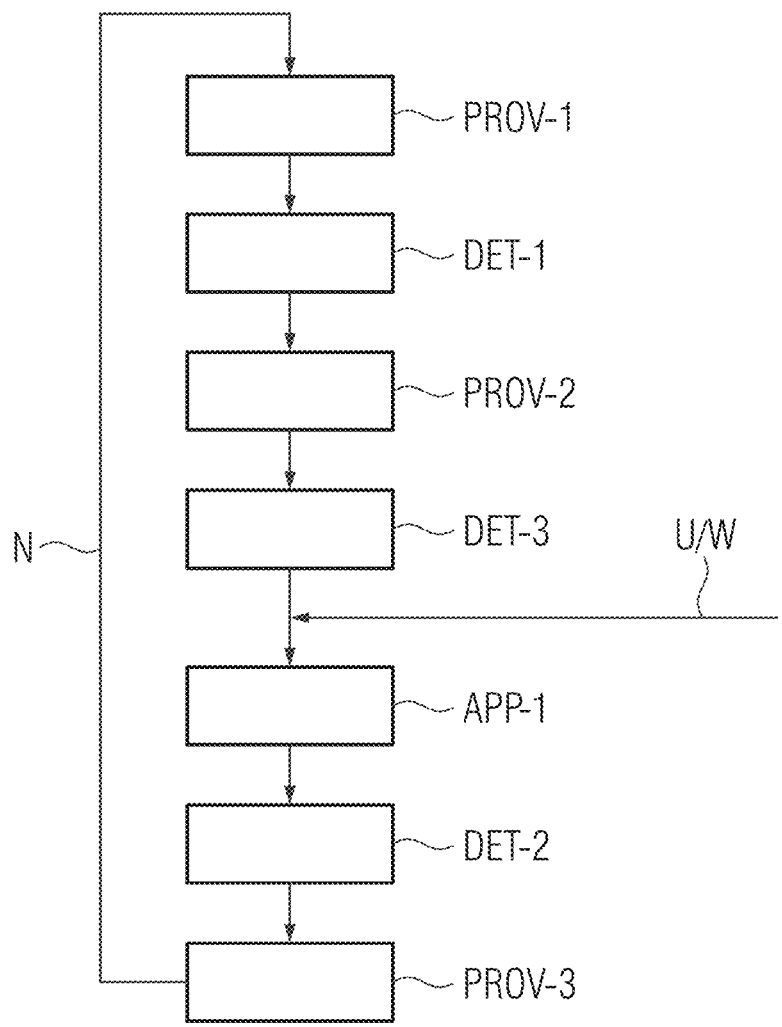

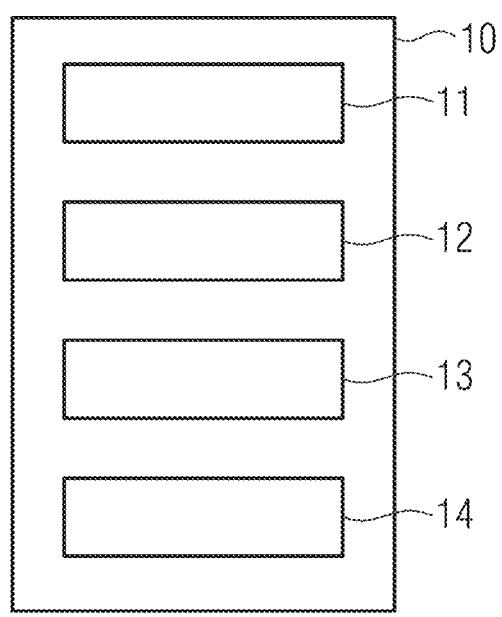

METHOD FOR DYNAMIC DATA MINIMIZATION OF A DATA SET BY MEANS OF WHITELISTING

PRIORITY STATEMENT

The present application hereby claims priority under 35 U.S.C. § 119 to German patent application number DE 102020203951.8 filed Mar. 26, 2020, the entire contents of which are hereby incorporated herein by reference.

FIELD

Example embodiments of the invention generally relate to a method for dyanmic data minimizatrion.

BACKGROUND

Typically, the processing and transfer of personal data is restricted by data protection laws. A data minimization of data sets, which comprise personal data, is an important method for compliance with data protection laws. During the course of data minimization it is ensured that only the personal data of a data set, which is also necessary for the respective purpose of processing, is transferred or processed. The data minimization can extend through to anonymization. This means that after performance of the data minimization, any personal references in the data set can be excluded. Data minimization is important specifically for sensitive personal data as exists in the field of medical technology in the form of patient data or in the case of traffic flow analysis.

Typically, a lot of personal data is stored in data sets with structured file formats. Structured data sets typically comprise at least one attribute. Attributes describe, in particular, the data stored in the data sets.

Typically, there are predefined and definable attributes. Predefined attributes are incorporated by any data set with the same reference. Defined attributes can be defined, for example, by a user, according to the reference of the data set. The reference of the data set can be, for example, a medical examination and/or a medical device, etc. Typically, an attribute value is assigned to each attribute in the case of a structured file format. An attribute describes the attribute value assigned to it in that it comprises a name or a code for the value.

Typically, in medical technology a result from an imaging system (for example from a computed tomography device, a C-arm, a magnetic resonance tomography device, a positron emission tomography device, a single photon emission computed tomography device, etc.) is stored in a data set, which is structured according to the DICOM standard.

Currently, two methods are typically used for data minimization of structured file formats:
- blacklisting: with blacklisting, the attributes, which with their assigned attribute values are to be removed from or replaced in the data set to be minimized, are defined in a blacklist.
- whitelisting: with whitelisting, the attributes, which with their assigned attribute values are to be retained unchanged or modified, are defined in a whitelist.

Blacklisting is problematic in particular from a data protection perspective and whitelisting in particular from an application perspective. In both cases a selection of attributes has to be actively made otherwise, in the event of doubt, blacklisting gives too many attributes with assigned attribute values and whitelisting too few.

With blacklisting there is typically the risk that attributes and their assigned attribute values are not incorporated by the blacklist or are not defined in the blacklist and are transferred, therefore even though they can contain personal data. The example of the DICOM standard illustrates this problem: the number of attributes (DICOM header attributes) directly defined in the DICOM standard is currently over 4,000, and in addition to these there are several thousand attributes whose type is determined by other encodings. The DICOM standard is expanded several times a year by attributes, which are in part personal. As a result of these dynamics it is difficult to define all personal attributes in the blacklist.

SUMMARY

The inventors have discovered that from a data protection perspective, whitelisting provides much greater security. The whitelist comprises only the attributes, which with their assigned attribute values are retained directly or in modified form (for example as a pseudonym or with reduced accuracy).

In particular, the whitelist comprises those attributes whose assigned attribute values are required for further processing and were previously clarified in accordance with data protection. With this approach, the inventors discovered that a problem is the manageability for a user of the minimized data set. It often transpires only during subsequent processing of the data set that considerably more attributes or their assigned attribute values are required for processing than assumed during creation of the whitelist. In practice, the inventors discovered that this results in unspecific error messages and lengthy error searches, also because the attributes that are not defined in the whitelist are not known to the user. The user friendliness of this method, which is preferred in terms of data protection, suffers considerably, therefore.

An embodiment of the present invention, therefore, provides a method which enables a dynamic and flexible data minimization based on whitelisting.

Embodiments of the application are directed to a method for dynamic data minimization of a data set for transfer of the minimized data set from a central instance to the outside of the central instance; a data minimization apparatus for data minimization of a data set; a computer program product and a computer-readable storage medium. Advantageous developments are specified in the claims and in the following description.

Embodiment solutions will be described hereinafter both in relation to the apparatuses and also in relation to the method. Features, advantages or alternative embodiments mentioned in this connection should likewise be transferred to the other subject matters and vice versa. In other words, the embodiments and the concrete claims (which are directed, for example, at an apparatus) can also be developed with the features, which are described or claimed in connection with a method. The corresponding functional features of the method are formed by corresponding concrete modules.

At least one embodiment of the invention relates to a computer-implemented method for dynamic data minimization of a data set for transfer of the minimized data set from a central instance to outside of the central instance, wherein the data set comprises a second set of individual attributes. The method has a method step of first provision of a whitelist. The whitelist comprises a first set of attributes, wherein the first set of attributes is a subset of the second set of attributes. The minimized data set comprises the first set of attributes. The method further has a method step of first determination of an attribute list, wherein the attribute list comprises a third set of attributes. The third set of attributes comprises at least the complement of the first set of attributes in relation to the second set of attributes. The method further has a method step of second provision of the attribute list by the central instance for use outside of the central instance.

An embodiment of the invention also relates to a data minimization apparatus for dynamic data minimization of a data set for transfer of the minimized data set from a central instance to outside of the central instance. The data set comprises a second set of individual attributes in this case. The data minimization apparatus comprises an interface and a computing unit. The interface is designed for first provision of a whitelist. The whitelist comprises a first set of attributes. The first set of attributes is a subset of the second set of attributes. The minimized data set comprises the first set of attributes. The computing unit is designed for first determination of an attribute list, wherein the attribute list comprises a third set of attributes. The third set of attributes comprises at least the complement of the first set of attributes in relation to the second set of attributes. The interface is further designed for second provision of the attribute list by the central instance for use outside of the central instance.

Embodiments of the invention also relate to a computer program product with a computer program and to a computer-readable medium. An implementation largely in terms of software has the advantage that previously used data minimization apparatus can also be easily retrofitted by way of a software update in order to operate in the described manner. In addition to the computer program, a computer program product of this kind can optionally comprise additional elements, such as for example documentation and/or additional components, as well as hardware components, such as for example hardware keys (dongles, etc.) in order to use the software.

In particular, an embodiment of the invention also relates to a computer program product with a computer program, which can be loaded directly into a memory of a data minimization apparatus, with program segments in order to perform all steps of the method for dynamic data minimization of a data set for transfer of the minimized data set from a central instance to outside of the central instance, and it embodiments when the program segments are executed by the data minimization apparatus.

In particular, an embodiment of the invention also relates to a computer-readable storage medium on which program segments, which can be read and executed by a determination system and/or a training system, are stored in order to perform all steps of the method for dynamic data minimization of a data set for transfer of the minimized data set from a central instance to outside of the central instance, and its embodiments when the program segments are executed by the data minimization apparatus.

In particular, an embodiment of the invention also relates to a computer-implemented method for dynamic data minimization of a data set for transfer of a minimized data set from a central instance to outside of the central instance, the data set including a second set of individual attributes, the method comprising:

provisioning a whitelist, the whitelist including a first set of attributes, the first set of attributes being a subset of a second set of attributes and the minimized data set including the first set of attributes;

determining an attribute list including a third set of attributes, the third set of attributes including at least a complement of the first set of attributes in relation to the second set of attributes; and provisioning the attribute list by the central instance, for use outside of the central instance.

In particular, an embodiment of the invention also relates to a data minimization apparatus for dynamic data minimization of a data set for transfer of the minimized data set from a central instance to outside of the central instance, the data set including a second set of individual attributes, the data minimization apparatus comprising:

an interface, designed to provision a whitelist, the whitelist including a first set of attributes, the first set of attributes being a subset of a second set of attributes, and the minimized data set including the first set of attributes; and a processor, designed to determine an attribute list including a third set of attributes, the third set of attributes including at least a complement of the first set of attributes in relation to the second set of attributes, wherein the interface is further designed to provision the attribute list by the central instance for use outside of the central instance.

In particular, an embodiment of the invention also relates to a non-transitory computer program product storing a computer program, directly loadable into a memory of a data minimization apparatus, including program segments to perform the method of an embodiment when the program segments are executed by the data minimization apparatus.

In particular, an embodiment of the invention also relates to a non-transitory computer-readable storage medium storing program segments, readable and executable by a data minimization apparatus, to perform the method of an embodiment when the program segments are executed by the data minimization apparatus.

BRIEF DESCRIPTION OF THE DRAWINGS

The above-described properties, features and advantages of this invention will become clearer and more comprehensible in conjunction with the following figures and their descriptions. The figures and descriptions are not intended to limit the invention and its embodiments in any way.

Identical components are provided with corresponding reference numerals in different figures. As a rule, the figures are not to scale.

In the drawings:

Figure 6:
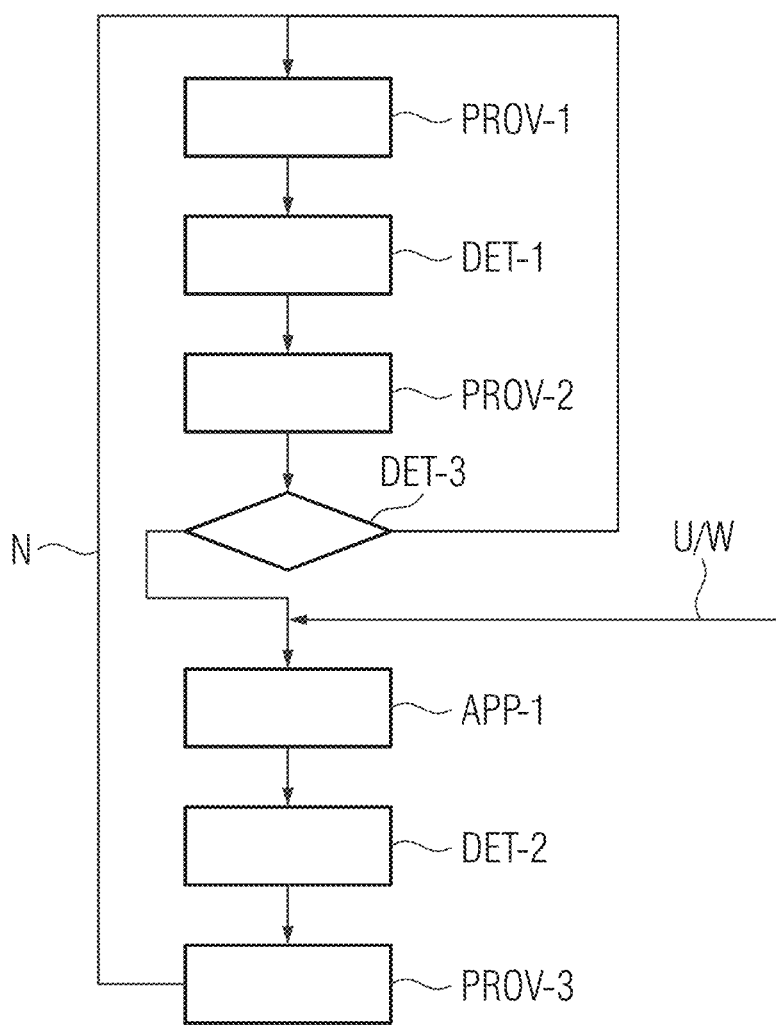
Figure 7:
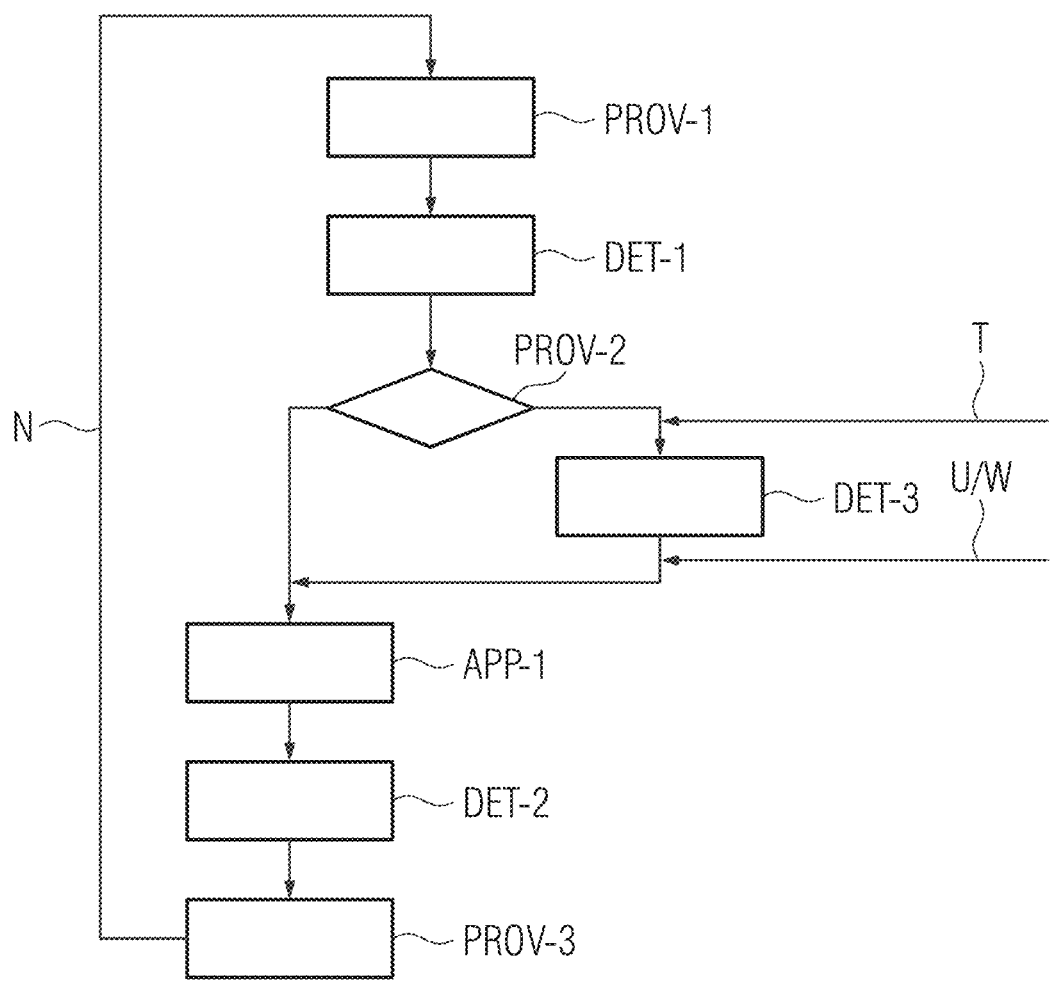
Figure 8:
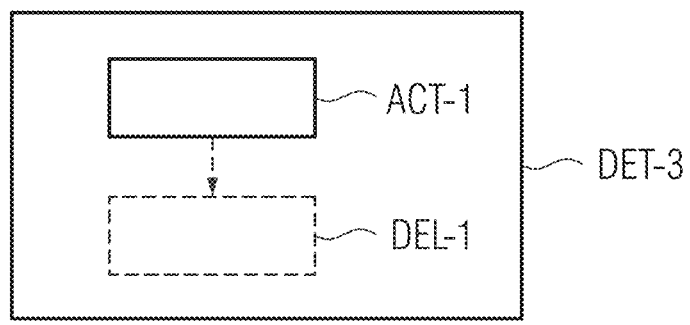
Figure 9:
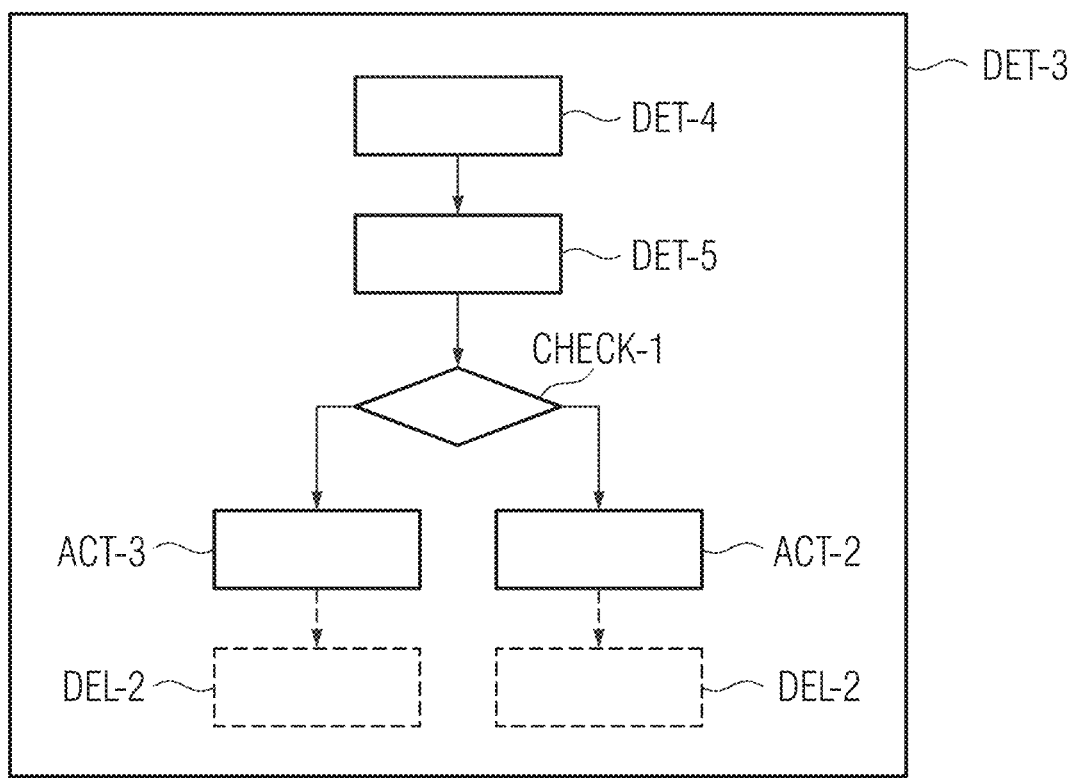

FIG. 1 shows a flowchart of a first example embodiment of the method for dynamic data minimization of a data set for transfer of the minimized data set from a central instance to outside of the central instance, FIG. 2 shows a flowchart of a second example embodiment of the method for dynamic data minimization of a data set for transfer of the minimized data set from a central instance to outside of the central instance, FIG. 3 shows a flowchart of a third example embodiment of the method for dynamic data minimization of a data set for transfer of the minimized data set from a central instance to outside of the central instance, FIG. 4 shows a flowchart of a fourth example embodiment of the method for dynamic data minimization of a data set for transfer of the minimized data set from a central instance to outside of the central instance, FIG. 5 shows a flowchart of a fifth example embodiment of the method for dynamic data minimization of a data set for transfer of the minimized data set from a central instance to outside of the central instance, FIG. 6 shows a flowchart of a sixth example embodiment of the method for dynamic data minimization of a data set for transfer of the minimized data set from a central instance to outside of the central instance, FIG. 7 shows a flowchart of a seventh example embodiment of the method for dynamic data minimization of a data set for transfer of the minimized data set from a central instance to outside of the central instance, FIG. 8 shows a flowchart of a first example embodiment of the method step of third determination of the actualized whitelist, FIG. 9 shows a flowchart of a second example embodiment of the method step of third determination of the actualized whitelist, FIG. 10 shows a data minimization apparatus.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a computer-implemented method for dynamic data minimization of a data set for transfer of the minimized data set from a central instance to outside of the central instance, wherein the data set comprises a second set of individual attributes. The method has a method step of first provision of a whitelist. The whitelist comprises a first set of attributes, wherein the first set of attributes is a subset of the second set of attributes. The minimized data set comprises the first set of attributes. The method further has a method step of first determination of an attribute list, wherein the attribute list comprises a third set of attributes. The third set of attributes comprises at least the complement of the first set of attributes in relation to the second set of attributes. The method further has a method step of second provision of the attribute list by the central instance for use outside of the central instance.

In particular, the data set is managed by the central instance. In particular, the data set can be a medical data set. In particular, the data set can comprise patient information. In particular, the data set can comprise information and/or parameters for acquisition of a medical image. In particular, the data set can be in the form of the DICOM standard. In particular, the data set can be in the form of an Electronic Health Record (EHR) or Electronic Medical Record (EMR), etc. In particular, the data set comprises the second set of attributes. An attribute comprises a designation for a property of data stored in the data set. In particular, an attribute can designate, for example, a property of personal data, such as for example 'patient's name', 'date of birth', 'pre-existing conditions', etc. In particular, an attribute can also designate properties of a measurement for acquisition of the data of the data set, such as for example 'acquisition time', 'measuring protocol', etc. In particular, an attribute can designate the corresponding property also in encoded form. In particular, the second set can comprise no attributes, one, or more than one attribute. In particular, the minimized data set can be part of the data set. Alternatively, the minimized data set can correspond to the data set.

The method step of first provision of the whitelist and of second provision of the attribute list takes place, in particular, via an interface. The interface is, in particular, part of a data minimization apparatus. First determination of the attribute list is performed, in particular, by a computing unit. In particular, the computing unit is part of the data minimization apparatus. In particular, the data minimization apparatus comprises the central instance. In particular, the central instance can comprise the interface and/or the computing unit.

In particular, "transfer to outside of the central instance" can mean that the minimized data set is provided with the interface for download for a user and/or a processing instance. In particular, it can also mean that the minimized data set is loaded into a cloud and is thus available to the user and/or the processing instance. The user can be, in particular, a person.

In particular, "outside of the central instance" can mean with the user and/or processing instance. In other words, the attribute list and/or the minimized data set can be transferred by the central instance, for example by way of a download or via a cloud, to the user and/or the processing instance. In particular, the user and/or the processing instance can use data, which is incorporated by the minimized data set, for processing the data or the minimized data set. In particular, the user and/or the processing instance can use the attributes outside of the central instance.

In particular, "for use" means that the user and/or the processing instance performs, for example a decision-making process, an actualization of the method or the whitelist, etc. based on the attribute list.

The whitelist can be provided, in particular, by the user and/or the processing instance. In particular, the whitelist can be created by the user and/or the processing instance and be received via the interface from the central instance. In particular, the user and/or the processing instance defines a first set of attributes in the whitelist, which it requires for processing the minimized data set. In other words, the data set can be minimized based upon the whitelist.

Alternatively, the whitelist can be provided internally within the central instance. In particular, the central instance can provide one or more whitelist(s). In particular, from the plurality of whitelists the whitelist can be selected with which the data set is minimized in such a way that the minimized data set is suitable for processing. In particular, the whitelist created for specific processing of the minimized data set can be selected and provided within the central instance.

In particular, the whitelist comprises the first set of attributes. In other words, the attribute list comprises the attributes of the first set of attributes. In particular, the first set of attributes is a subset of the second set of attributes. In particular, the first set of attributes can comprise no attributes, one or more than one attribute. In particular, the first set of attributes can comprise at most all attributes from the second set of attributes. In particular, the attributes of the first set of attributes are those attributes, which are necessary for processing the minimized data set by the user and/or the processing instance. In particular, the minimized data set comprises the first set of attributes.

In particular, the attributes of the first set of attributes can be checked for conformity with a data protection law or data protection directives applicable to the user and/or the processing instance and/or the central instance.

In the method step of first determination, the attribute list is determined. In particular, the attribute list comprises the third set of attributes. In other words, the attribute list comprises the attributes of the third set of attributes.

In particular, the third set of attributes is at least the complement of the first set of attributes in relation to the second set of attributes. In particular, the third set of attributes can also comprise attributes, which are incorporated by the first set of attributes. In particular, the third set of attributes can also comprise attributes, which are not incorporated by the first and/or second set of attributes. In particular, the third set of attributes comprises at least the attributes of the second set of attributes, which are not incorporated by the first set of attributes. In other words, the attribute list comprises at least the attributes of the data set, which are not already incorporated by the whitelist, therefore. In particular, the third set of attributes can comprise no attributes, one or more than one attribute.

In particular, the third set of attributes is exactly the complement of the first set of attributes in relation to the second set of attributes. In other words, the third set of attributes then comprises exactly the attributes from the second set of attributes, which are not incorporated by the first set of attributes. In other words, the attribute list comprises the attributes of the data set, which are not already incorporated by the whitelist, therefore. In particular, the third set of attributes can comprise no attributes, one or more than one attribute.

The attribute list is provided in the step of second provision of the attribute list via the interface for use outside of the central instance. In particular, the attribute list is provided to the user and/or the processing instance. In other words, the attribute list is transferred to the user and/or the processing instance. In particular, the user and/or the processing instance can receive the attribute list. In particular, the user and/or the processing instance can be different from the user and/or the processing instance, which created the whitelist. In particular, the same user and/or the same processing instance can create the whitelist and receive the attribute list. In particular, the user and/or the processing instance receives by way of the attribute list information as to which properties of the data of the data set are available in addition to the properties defined by the attributes of the first set.

In particular, "dynamic" data minimization means that the user is provided with information, which allows him to adjust the data minimization to his requirements. In particular, with knowledge of the attribute list, the user can dynamically adjust the data minimization to processing of the minimized data set.

The inventors have found that by way of the attribute list the user and/or the processing instance can be informed about which attributes are available in addition to the attributes defined in the whitelist. In addition, the inventors have found that provision of the attribute list does not entail any problems in respect of data protection since the attribute list in the form of the attributes only includes information about which properties or data of the data set exist. The attribute list does not include any information about a value of such a property. For example, the attribute list can include the attribute 'patient's name'. Consequently, the user knows that information about the patient's name exists in the data set. However, by way of the attribute list he does not receive any information as to what the patient's name is. The information about additional attributes, attributes not mentioned in the whitelist, are filtered out from the minimized data set, which the user receives, by application of the whitelist. Without the attribute list the user does not know which attributes are still available.

The inventors have also found that provision of the attribute list assists the user and/or the processing instance in the performance of the technical task of dynamic data minimization. In particular, due to the information provided in the attribute list, the user and/or the processing instance can dynamically adjust the data minimization to a more extensive task for the minimized data set. The inventors have also found that the method entails advantages in particular in the medical field. Medical data sets are predominantly in the form of a structured file format such as the DICOM standard. This means that the data sets already comprise attribute value pairs and the described method can be performed directly on the medical data sets. In addition, medical data sets comprise a large proportion of sensitive, personal data, for which reason a reliable data minimization is essential. Since new applications for use on the medical data sets are appearing on the market all the time and existing applications are being expanded or improved, it is necessary to dynamically adjust the data minimization without running the risk of infringing the applicable data protection directives. The inventors have found that these tasks or requirements can be advantageously achieved or fulfilled by the described method.

According to one embodiment of the invention, the whitelist comprises at least one rule for each attribute of the first set of attributes. In addition, an attribute value is assigned to each attribute of the second set of attributes. The method further comprises the method step of first application of the rules of the whitelist to the attribute values of the attributes of the first set of attributes in such a way that a modified attribute value is determined for each attribute of the second set of attributes. The method further comprises a method step of second determination of the minimized data set, wherein the minimized data set comprises the first set of attributes, wherein the minimized data set comprises the modified attribute value for each attribute of the first set of the attributes. In addition, the method comprises a method step of a third provision of the minimized data set by the central instance for use outside of the central instance.

An attribute value is assigned to each attribute of the second set. In other words, each attribute of the second set, with the corresponding attribute value, forms an attribute value pair. In particular, the data set comprises attribute value pairs, wherein the attributes of these attribute value pairs are incorporated by the second set of attributes. The attribute value indicates the value for the property of the data set defined by the corresponding attribute. For example, the attribute value of the attribute 'date of birth' comprises the actual date of birth of a patient, to which the data set is assigned or the attribute value relating to the attribute 'acquisition time' comprises the time in 'ms' taken by an acquisition, to which the data set is assigned.

A rule is assigned to each attribute of the first set. In other words, one attribute of the first set and one rule respectively form one attribute rule pair. In particular, each attribute of the first set of attributes is also incorporated by the second set of attributes. In particular, the attribute value can be assigned to each attribute of the first set according to the attribute value pair of the second set, therefore. A rule describes how the attribute value of the corresponding attribute defined in the whitelist should and/or may be transferred to outside of the central instance. In particular, the rules can comply with the data protection rules. In particular, a rule can specify, for example, whether an attribute value should be transferred unchanged, pseudonymized, encrypted, and/or not at all. The rules can be, for example, predetermined according to the requirements of the user for processing the data set and/or be predetermined by data protection directives.

In the method step of first application of the rules of the whitelist to the attribute values of the attributes of the first set of attributes, the attribute values are, for example, not changed, pseudonymized, encrypted and/or deleted in accordance with the rule. A modified attribute value is determined by applying the corresponding rule for each attribute of the first set of attributes. In particular, each attribute of the first set of attributes, with the modified attribute value, forms a modified attribute value pair.

The minimized data set is determined in the method step of second determination based upon the modified attribute value pair. In particular, the minimized data set comprises the modified attribute value pairs. In other words, the minimized data set comprises the attributes of the first set of attributes and the associated modified attribute values.

In particular, the minimized data set can correspond with the data protection directives. In particular, the minimized data set can comprise only the attributes or modified attribute value pairs, which are necessary for processing the minimized data set. In particular, the modified attribute values can be modified according to the data protection directives.

In the method step of third provision, the minimized data set is provided for use outside of the central instance. In other words, the minimized data set is provided for processing the data of the minimized data set. In particular, the minimized data set can be provided to the user and/or the processing instance. In particular, provision of the minimized data set can take place by way of an interface. In particular, provision can be, for example, a provision of the minimized data set for download and/or in a cloud.

The inventors have found that by applying rules to the attribute values it is possible to ensure adherence to data protection directives. In addition, the inventors have found that, depending on the respective attribute of the first set of attributes, a rule specific to the attribute can be constructed. In particular, it is possible to prevent either all attribute values from being pseudonymized or not being transferred, therefore or the data protection directives not being adhered to for some attribute values in order to provide sufficient information for processing the minimized data set.

According to one embodiment of the invention, the method steps are performed in a loop, wherein the loop comprises at least one executed loop. The data set has a plurality of individual files. The method steps for the individual files are performed in the loop in such a way that one file is minimized in each executed loop. The attribute list is adjusted to the file of the executed loop in each executed loop in the process.

The data set has a plurality of individual files. Each file of the data set can be dealt with like a separate data set. In particular, each method step can be performed for each file as described above for the data set.

In particular, the files can be different in pairs with different executed loops. In other words, the method steps for a different file can be performed in each executed loop. In particular, a file is minimized with each executed loop. In particular, the attributes of the second set of attributes can be at least partially different in the files.

Alternatively, a file can pass through a plurality of executed loops.

In particular, the attribute list can be adjusted in a executed loop in such a way that the attribute list comprises all attributes from the attribute lists of the preceding executed loops.

In particular, attribute lists from different executed loops can be compared. In particular, changes in the attributes of the files can be observed and/or analyzed in this way. In particular, by comparing the actualized attribute lists it is possible to identify if a new attribute has been added to a file.

The inventors have found that by adjusting the attribute list the user receives information about changes in the attributes in the files. The inventors have found that this information improves the adjusting of the data minimization.

According to one embodiment of the invention, for each attribute of a first subset of the third set of attributes the attribute list comprises a marker, which indicates whether the respective attribute was already incorporated by the third set of attributes in a preceding executed loop.

In other words, each attribute in the attribute list, which was already incorporated by an attribute list, which was provided in a previous executed loop, is provided with a marker. The set of attributes provided with a marker forms the first subset of the third set of attributes of the current executed loop. The markers mark the attributes, which the user already knows. In other words, the markers mark the attributes of the third set of attributes, which were already provided to the user in the form of an attribute list in a preceding executed loop.

Alternatively, all other attributes can be provided with a marker and the attributes of the first subset can be unmarked.

Alternatively, all attributes can be marked. The marker depends on whether the corresponding attribute is incorporated by the first subset or not.

The marker can be, for example, a value, which is assigned to the attributes to be marked. This value can be, for example, '0' or '1'. Alternatively, the value can be 'True' or 'False'. Alternatively, the attribute list can comprise two sub-lists. The marked attributes are listed in one of the sub-lists. All other attributes of the third set of attributes are listed in the other sub-lists.

The inventors have found that marking the attributes that are already known can speed up and simplify the adjusting of the data minimization. In particular, attributes that are already known are not repeatedly checked for whether they are suitable for adjusting the data minimization.

According to a further embodiment of the invention, the attribute list for each attribute of a second subset of the third set of attributes comprises a marker, which indicates whether the respective attribute is included in the first set.

In other words, the marker indicates whether an attribute of the third set of attributes is incorporated by the whitelist.

The marker can be designed analogously to the above description of the marker.

In particular, the marker, which marks the attributes of the first subset, and the marker, which marks the attributes of the second subset, can be identical. Alternatively, the two markers can be different.

Alternatively, all other attributes, which are not part of the first and/or second subset, can be provided with a marker and the attributes of the first and/or second subset are not marked.

Alternatively, all attributes can be marked. The marking is different for attributes, which are incorporated by the first and/or second subset and for the remaining attributes of the first set of attributes.

The inventors have found that marking the attributes already incorporated in the whitelist speeds up and simplifies the adjusting of the data minimization. In particular, it is possible for the user and/or the processing instance to see directly which attributes he no longer needs to consider for adjusting the data minimization.

According to a further embodiment of the invention, the attribute list comprises a frequency value for each attribute of the third set of attributes. The frequency value describes the occurrence frequency of the attribute in the data set.

In particular, the frequency value for an attribute can describe the occurrence frequency of the attribute in the second set of attributes of the data set.

In particular, the occurrence of an attribute in a plurality of files of the data set can be counted successively in the loop. In particular, each file can comprise a second set of attributes. The attribute list can be successively expanded over the files during execution of the loop. For attributes already incorporated by the attribute list the frequency value is increased by one on renewed occurrence of the attribute in the second set.

In particular, the frequency value of an attribute can comprise a natural number, which describes the frequency of the occurrence of the attribute in the set of data sets.

The inventors have found that it is possible to derive the importance or influence of an attribute on the data set from its frequency of occurrence. Consequently, the frequency value is a further factor, which can be used for adjusting the data minimization.

According to a further embodiment of the invention, the method further comprises a method step of third determination of an actualized whitelist based on the attribute list, in particular based upon the number of attributes in the attribute list and/or a user input in relation to an attribute and/or a rule in relation to the attribute list.

In particular, the step of third determination of the actualized whitelist in the above-described method can be performed after provision of the attribute list.

In particular, third determination of the actualized whitelist can be preceded by a check step. In particular, it is possible to check in this check step whether the whitelist should be actualized. If the check is positive in the check step, the method step of third determination of the actualized whitelist can be performed.

In particular, the method step of third determination of the actualized whitelist can be performed in each executed loop if the method is carried out in the loop.

Alternatively, the method step of third determination of the actualized whitelist cannot be performed in each executed loop if the method is carried out in the loop. In particular, the performance of third determination of the actualized whitelist in the case of a executed loop can be initiated manually and/or automatically and/or be triggered. In particular, after third determination of the actualized whitelist in the subsequent executed loops, the actualized whitelist is provided as the whitelist.

In particular, the actualized whitelist replaces the whitelist. In particular, the term "whitelist" can hereinafter be taken to mean the actualized whitelist or the whitelist.

In particular, data minimization can be adjusted by determination of the actualized whitelist. In particular, determination of the actualized whitelist can be an adjustment of the whitelist sein. In particular, the whitelist can be adjusted in such a way that the first set of attributes is supplemented by one or more attribute(s). In particular, the whitelist is actualized with the intention that the minimized data set is better suited to processing by the user and/or the processing instance.

In particular, third determination of the actualized whitelist can be performed based upon different factors. In other words, third determination of the actualized whitelist can be initiated by different factors. In other words, third determination of the actualized whitelist can be triggered by different factors.

In particular, a frequency value of an attribute can initiate or trigger third determination of the actualized whitelist when a predefined threshold value is exceeded. In other words, if a frequency value of an attribute in the attribute list exceeds the threshold value, the check step can be triggered. In particular, the threshold value can be individually defined for each attribute of the attribute list. In this check step it is then possible to check whether an attribute, specifically the attribute whose frequency value has initiated the check step, should be included in the whitelist. If this is the case the method step of third determination of the actualized whitelist is performed.

In particular, attributes already marked can be ruled out as an initiator or a trigger for the check step. In particular, the marker for the first and/or second subset can be used for this.

In particular, the number of attributes in the attribute list can be an initiator or trigger for third determination of the actualized whitelist. In particular, the number of attributes in the attribute list can be an initiator or a trigger for the check step.

In particular, third determination of the actualized whitelist can be initiated or triggered by a user input. In other words, the user can actualize the whitelist or initiate third determination of the actualized whitelist at any time.

In particular, third determination of the actualized whitelist can take place as a function of a rule in relation to the attribute list.

In particular, third determination can be performed as often as desired. In particular, the whitelist can be iteratively adjusted or actualized in this way.

The inventors have found that the attribute list can be used as the basis for actualizing the whitelist. In particular, the user can thus be provided with information as to which possible attributes can be included in the whitelist. The inventors have found that this knowledge simplifies the actualizing of the whitelist. In addition, knowledge about the available attributes based upon the attribute list allows the user to add attributes, which optimize processing, to the whitelist.

According to a further embodiment of the invention, third determination comprises a method step of a first actualization of the whitelist, wherein first actualization comprises adding an attribute from the attribute list to the whitelist.

In particular, more than one attribute from the attribute list can be added to the whitelist.

The inventors have found that the attribute list can be used as the basis for actualizing the whitelist. In addition, the inventors have found that by adding a suitable attribute from the attribute list to the whitelist, the minimized data set determined with the actualized whitelist can be adjusted to the processing.

According to a further embodiment of the invention, the third determination further comprises a method step of a first deletion of the attribute added to the whitelist from the attribute list.

In particular, the method step of first deletion can be carried out after the method step of first actualization. In particular, deletion of the attribute added to the whitelist from the attribute list can prevent the attribute list from becoming too long and/or unclear. In particular, this prevents the same attribute from the attribute list from being accidentally added to the whitelist twice, therefore.

The inventors have found that the clarity of the attribute list is retained by deleting the added attribute from the attribute list. In addition, the inventors have found that duplicated or redundant storage of attributes can be avoided, therefore. In particular, storage space can thus be saved. In addition, the provided attribute list is smaller or comprises fewer attributes, therefore. In particular, less data has to be transferred, therefore.

According to a further embodiment of the invention, third determination of the actualized whitelist is performed manually, initiated by a trigger.

In particular, the trigger can output a trigger signal to the user, which indicates that a check step should be performed. In particular, the user is a person in this aspect of the invention. In the check step, the user can decide whether the whitelist should be actualized. In particular, the trigger signal can be visual and/or acoustic. Alternatively, the trigger signal can be, for example, mail, which is sent to the user. Alternatively, the trigger signal can be a pop-up window, which appears on the user's screen.

In particular, the trigger can be configured to be application- and/or user-specific. In particular, the trigger can be output as a function of the frequency value and/or the number of attributes in the attribute list and/or a user input in relation to an attribute and/or a rule in relation to the attribute list. In particular, the trigger can be time-controlled.

In particular, third determination of the whitelist can be performed manually by the user. In particular, based upon the attribute list the user can decide which attribute(s) from the attribute list should be included in the whitelist or the first set of attributes. In particular, the user can use the frequency value of an attribute and/or the marker of an attribute to assist him with the decision. In particular, the user can determine a rule for each attribute, which is to be included in the whitelist. In particular, the user can add the attribute rule pair to the whitelist.

In particular, the user can delete each attribute, which is included in the whitelist, from the attribute list.

The inventors have found that by applying a trigger it is possible to ensure a regular and/or application-specific implementation of a check step for actualization of the whitelist. In particular, the inventors have found that the trigger can be specifically configured depending on the application. In addition, the inventors have found that a manual third determination of the actualized whitelist is possible based upon the attribute list.

According to a further embodiment of the invention, the trigger is time-controlled.

In other words, the trigger activates after a particular period has elapsed. In particular, the trigger can activate or initiate the trigger signal after the period has elapsed. In particular, the period can be measured beginning with the most recent or previous trigger signal. In particular, the period can be measured beginning with an instant of the most recent actualization of the whitelist. In particular, the period can be measured beginning from the most recent event. The event can be, for example, the most recent activation of the trigger and/or the most recent actualization of the whitelist and/or the most recent checking of the attribute list during the check step. In particular, the measurement of the period can be started manually or automatically.

In particular, the trigger can initiate the check step. The method step of third determination of the actualized whitelist can in turn be performed as a function of the result of the check step. In particular, the method step of third determination of the actualized whitelist can be performed in the case of a positive result of the check step.

The inventors have found that a time-controlled trigger is easy to achieve. In particular, with a time-controlled trigger it is possible to ensure that a check step for checking whether the third determination of the actualized whitelist should be performed, is carried out at regular intervals.

According to a further embodiment of the invention, the trigger is controlled by the number of attributes in the third set of attributes.

In other words, the trigger is controlled by the number of attributes in the attribute list. In particular, the trigger can activate when the number of attributes in the third set of attributes changes. In particular, the trigger can activate when the number of attributes in the third set of attributes becomes greater. In particular, activation of the trigger can be connected with the trigger signal. In other words, activation of the trigger can initiate emission of the trigger signal.

In particular, the trigger can initiate the check step, in which a check is made as to whether the method step of third determination of the actualized whitelist should be performed.

The inventors have found that control of the trigger by way of the number of attributes in the third set of attributes ensures that when the attribute list changes, a check step is carried out as to whether the whitelist should be actualized. In addition, the inventors have found that consequently, a check step is only carried out if something has changed. In particular, this prevents the third determination from being performed repeatedly based upon the same or an unchanged attribute list. The inventors have found that working time or computing time can thus be saved since the check step or the method step of third determination is only performed if the attribute list has changed.

According to one further possible embodiment of the invention, the trigger is controlled by the frequency value.

In particular, the trigger can be activated if the frequency value of an attribute exceeds a predefined threshold value. The threshold value can be defined by the user. Alternatively, the threshold value can be predefined as depending on the application. In particular, the threshold value can be individually defined or predefined for each attribute in the attribute list.

The inventors have found that by way of the frequency value it is possible to make a statement about the importance of an attribute. In addition, the inventors have found that the check step should be performed if an attribute in the attribute list is classed as important. In particular, the check step should be initiated with a trigger. The classification is then made based upon the threshold value of the frequency value.

According to one further possible embodiment of the invention, the trigger can be time-controlled and/or be controlled by the number of attributes and/or by the frequency value.

In other words, the trigger can be controlled by a combination of the above-described triggers. In particular, a measurement of the period, which has to elapse before the time-controlled trigger is activated, can restart on activation of a trigger based upon the number of attributes and/or frequency value.

The inventors have found that a combination of the triggers can firstly ensure that a check step is carried out at regular intervals. Secondly, it is possible to react promptly to changes in the attribute list with the aid of the triggers, which are controlled by the number of attributes and the frequency value.

According to an alternative embodiment of the invention, third determination of the actualized whitelist takes place automatically. Third determination of the actualized whitelist is initiated by the trigger.

The trigger can be designed according to an above-described aspect. Third determination is performed in this aspect of the invention by the processing instance. In particular, the trigger signal can be a data signal for the processing instance. In particular, the data signal can initiate the check step by the processing instance. In particular, it is possible to check in the check step whether the method step of third determination of the actualized whitelist should be performed.

In particular, the whitelist can be actualized without user action. In particular, the attribute list can be analyzed automatically by the processing instance and in a check step it is possible to automatically decide whether the method step of third determination of an actualized whitelist should be carried out. In particular, third determination then also takes place automatically.

The inventors have found that with an automatic third determination of the whitelist, which is activated by a trigger, no user action is required. The inventors have found that this assists with speeding up workflows.

According to a further embodiment of the invention, automatic third determination of the actualized whitelist further comprises a method step of a fourth determination as to whether an attribute in the attribute list is unknown to a user and/or a processing instance. In addition, the method comprises a method step of a fifth determination of a data format of the attribute value of the unknown attribute. In addition, the method comprises a method step of a first check as to whether the data format of the attribute value of the unknown attribute matches a data format of an attribute value of a matching attribute in the first set of attributes.

In particular, third determination of the actualized whitelist takes place automatically in this aspect of the invention. In particular, fourth determination can take place based upon a classification. In particular, each attribute of the attribute list can be classified as "known" or "unknown". An attribute classified as unknown is referred to as an unknown attribute hereinafter. In particular, only some of the attributes of the first set of attributes can be classified. In particular, as a minimum, one attribute of the first set of attributes can be classified. In particular, as a maximum, all attributes of the first set of attributes can be classified. In particular, any number of attributes of the first set of attributes between the two extremes can be classified.

In particular, fourth determination can take place by way of the marker(s). In particular, an attribute with the marker, which marks attributes in the attribute list, which are incorporated in the whitelist, is assumed to be or classified as known. In particular, attributes, which were marked with the marker, which marks attributes, which were already incorporated in a previous attribute list and/or which were checked by the user and/or the processing instance in the check step, are classified as known. In particular, attributes without markers are classified as unknown.

Alternatively, an attribute, which is only incorporated in the attribute list and not in the whitelist, can be classified as unknown.

Alternatively, an attribute in the attribute list, which was already classified as unknown in a previous executed loop, can be classified as known.

In particular, more than one attribute can be classified as unknown.

Alternatively, all attributes of the attribute list, which were already classified as unknown in a previous executed loop, can be incorporated by a further list. All attributes in the attribute list, which were not incorporated by this list and/or the whitelist, are assumed to be or are classified as unknown.

In particular, each attribute value is acquired in a data format. In particular, a data format can be, for example, a 'string', a 'date value', a 'monetary value', a 'numeric value', etc.

In particular, for each unknown attribute in the data set the corresponding attribute value can be assigned based upon the attribute value pairs of the data set. In particular, the data format of this attribute value can be determined in the step of fifth determination.

In particular, in the method step of first checking, it is possible to check whether an attribute is in the first set of attributes whose assigned attribute value has the same data format as the unknown attribute. In other words, during first checking a check is made as to whether an attribute value of an attribute from the whitelist has the same data format as the attribute value of the unknown attribute. An attribute of this kind is referred to as a matching attribute.

The inventors have found that automatic third determination of the actualized whitelist can be performed based upon the data format of an attribute value of an unknown attribute. The inventors have found that based upon the data format it is possible to automatically check whether an attribute with an attribute value of the same data format is already incorporated in the whitelist.

According to a further embodiment of the invention, the method further comprises a method step of second actualization of the whitelist by adding the unknown attribute and the rule of the matching attribute if first checking of the data format produced a match.

A rule is assigned to each attribute of the first set of attributes in the whitelist. On first application, the rule is applied to the attribute value assigned to the attribute in order to determine the minimized data set in the method step of second determination. The rule can be, in particular, specific to a data format. In particular, the rule of the matching attribute from the whitelist can then also be applied to the attribute value of the unknown attribute. In particular, the rule of the matching attribute can then also be assigned to the unknown attribute. This attribute rule pair can then be added to the whitelist.

In particular, the data format of more than one attribute value, which is assigned to an attribute of the first set of attributes, can match the data format of the attribute value of the unknown attribute. In other words, a plurality of matching attributes can be determined for an unknown attribute. In particular, the rules of the plurality of matching attributes can be the same. The procedure can then be as described above.

Alternatively, at least two different rules can be assigned to the matching attributes. These different rules can be presented to a user who decides which of the rules should be assigned to the unknown attribute. Alternatively, the rules can be classified. The classes of this classification can describe, for example, the degree of modification of an attribute value by the rule. The classes can be, for example, 'unchanged', 'pseudonymized', 'anonymized', etc. For example, the class 'unchanged' comprises rules, which modify an attribute value to a lesser extent than the class 'anonymized'. In particular, based upon this classification it is possible to find from the different rules the rule, which, in relation to the classes of the plurality of rules, is assigned to the class with the greatest modification. In particular, this rule can be assigned to the unknown attribute. In particular, the unknown attribute can be added with this rule to the whitelist.

The inventors have found that based on the already known rules, a completely automatic or almost completely automatic third determination of the actualized whitelist is possible. In addition, the inventors have found that with a selection from a plurality of rules, the rule with the greatest modification is to be assigned to the unknown attribute. The risk of too much information being transferred can thus be minimized.

According to a further embodiment of the invention the method comprises further method steps if first checking of the data format did not produce a match. In this case, the method comprises a method step of a third actualization of the whitelist, wherein the third actualization is performed manually. Manual performing comprises creating a rule for the unknown attribute and adding the unknown attribute and the associated rule to the whitelist.

In particular when there is no match in data formats, a manual check step is performed. In particular, the manual check step can be performed by the user. In particular, the user can decide in the check step whether the unknown attribute should be added to the whitelist or not.

If the unknown attribute is not to be added, no further steps are performed. If the method is running in a loop, the next executed loop then begins.

If the unknown attribute is to be added to the whitelist the method step of third actualization of the whitelist is performed. On third actualization, the user firstly creates a rule for the unknown attribute. This rule is configured in such a way that the attribute value, when the rule is applied to it, complies with the data protection directives. In the method step of third actualization of the whitelist, the user then adds the unknown attribute and the rule to the whitelist.

The inventors have found that even with manual actualization of the whitelist the method step of third determination of the actualized whitelist can be performed more efficiently if the unknown attributes are already automatically extracted from the attribute list. The user no longer has to search through the attribute list manually for changes or new attributes, therefore.

According to a further embodiment of the invention, the method further comprises a method step of second deletion of the unknown attribute from the attribute list.

In particular, the unknown attribute can then be removed from the attribute list if it was previously added to the whitelist in the step of second actualization or of third actualization.

The inventors have found that the clarity of the attribute list can be improved by deleting the attributes in the whitelist from the attribute list. In particular, the check step can be sped up and made more efficient, therefore since no attributes in the attribute list that are already known are checked in the check step. In addition, the inventors have found that storage space can be saved if redundant information is deleted.

According to a further embodiment of the invention, the method steps of first application of the rules, of second determination of the minimized data set and of third provision of the minimized data set are performed following confirmation of the whitelist and/or the actualized whitelist by a user and/or a processing instance.

In particular, third determination of the actualized whitelist can be performed before the rules are applied to the attribute values of the attributes incorporated by the whitelist. In particular, the step of third determination of the actualized whitelist can be performed as often as desired. In particular, the step of third determination of the whitelist can be performed in all above-described aspects. The data set is only minimized by applying the rules if the user and/or the processing instance confirms the actualized whitelist. In particular, only the most recent version of the actualized whitelist or the whitelist is applied for determination of the minimized data set, therefore. In other words, only rules are applied to the attribute values of the attributes, which are incorporated by the most recent version of the actualized whitelist or the whitelist. In particular, the user and/or the processing instance can omit the method step of third determination of the actualized whitelist and confirm the whitelist directly. In particular, the user and/or the processing instance can confirm the actualized whitelist or the whitelist based upon the attribute list.

The inventors have found that it is frequently necessary to iteratively adjust or actualize the whitelist. To save computing time the minimized data set is determined by applying the rules only once with the most recent version of the whitelist. The inventors have found that this results in speeding-up of the method and a reduction in computing time.

An embodiment of the invention also relates to a data minimization apparatus for dynamic data minimization of a data set for transfer of the minimized data set from a central instance to outside of the central instance. The data set comprises a second set of individual attributes in this case. The data minimization apparatus comprises an interface and a computing unit. The interface is designed for first provision of a whitelist. The whitelist comprises a first set of attributes. The first set of attributes is a subset of the second set of attributes. The minimized data set comprises the first set of attributes. The computing unit is designed for first determination of an attribute list, wherein the attribute list comprises a third set of attributes. The third set of attributes comprises at least the complement of the first set of attributes in relation to the second set of attributes. The interface is further designed for second provision of the attribute list by the central instance for use outside of the central instance.

A data minimization apparatus of this kind can be designed, in particular, to perform the above-described method for dynamic data minimization of a data set for transfer of the minimized data set from a central instance to outside of the central instance, and its aspects. The data minimization apparatus is designed to perform this method and its aspects in that the interface and the computing unit are designed to perform the corresponding method steps.

Embodiments of the invention also relate to a computer program product with a computer program and to a computer-readable medium. An implementation largely in terms of software has the advantage that previously used data minimization apparatus can also be easily retrofitted by way of a software update in order to operate in the described manner. In addition to the computer program, a computer program product of this kind can optionally comprise additional elements, such as for example documentation and/or additional components, as well as hardware components, such as for example hardware keys (dongles, etc.) in order to use the software.

In particular, an embodiment of the invention also relates to a computer program product with a computer program, which can be loaded directly into a memory of a data minimization apparatus, with program segments in order to perform all steps of the method for dynamic data minimization of a data set for transfer of the minimized data set from a central instance to outside of the central instance, and it embodiments when the program segments are executed by the data minimization apparatus.

In particular, an embodiment of the invention also relates to a computer-readable storage medium on which program segments, which can be read and executed by a determination system and/or a training system, are stored in order to perform all steps of the method for dynamic data minimization of a data set for transfer of the minimized data set from a central instance to outside of the central instance, and its embodiments when the program segments are executed by the data minimization apparatus.

FIG. 1 shows a flowchart of a first example embodiment of the method for dynamic data minimization of a data set for transfer of the minimized data set from a central instance to outside of the central instance.

A data set is minimized in the central instance based upon a whitelist. In other words, a minimized data set is determined based upon the whitelist. The data set comprises a second set of attributes. One attribute value is assigned to each attribute of the data set or of the second set. In other words, the attribute describes a property, and the attribute value the value of this property. Typically, the data set relates to a medical examination, a medical device etc. Typically, the attributes of the second set of attributes are dependent on this relationship. In other words, this relationship determines which attributes are incorporated by the second set. The whitelist comprises a first set of attributes. In other words, the whitelist comprises the attributes of the first set of attributes. The first set of attributes is a subset of the second set of attributes. The minimized data set comprises the first set of attributes.

In the method step of first provision PROV-1 of a whitelist, a whitelist is provided either by a user U and/or a processing instance W and/or internally by a central instance. The whitelist is provided via an interface.

In the method step of first determination DET-1 of an attribute list, the attribute list is determined based upon the data set and the whitelist. The attribute list comprises a third set of attributes. In other words, the attribute list comprises the attributes of the third set of attributes. The attribute list comprises at least the attributes from the data set or from the second set of attributes, which are not incorporated by the whitelist or the first set of attributes. In other words, the attribute list or the third set of attributes comprises at least the complement of the first set of attributes in relation to the second set of attributes.

In the method step of second provision PROV-2, the attribute list is provided for use outside of the central instance. Provision can take place via an interface. Provision can take place, for example, in the form of a download and/or via a cloud. Outside of the central instance can be with a user U and/or a processing instance W. The user U is a person. The processing instance W is a computing unit. The user U and/or the processing instance W can use the attribute list. In particular, by way of the attribute list the user U and/or the processing instance W are informed about which attributes are present in the data set in addition to the attributes of the whitelist or the first set of attributes. Up to this point the user U and/or the processing instance W only know about the attributes of the first set of attributes. Since no attribute values are incorporated in the attribute list there are no concerns about the attribute list in relation to data protection.

FIG. 2 shows a flowchart of a second example embodiment of the method for dynamic data minimization of a data set for transfer of the minimized data set from a central instance to outside of the central instance.

The method steps of first provision PROV-1 of the whitelist, of first determination DET-1 of the attribute list and of second provision PROV-2 of the attribute list are performed analogously to the description according to FIG. 1.

Since each attribute from the first set of attributes is also incorporated by the second set of attributes, an attribute value can be assigned to each attribute from the first set of attributes. The whitelist comprises a rule for each attribute of the first list of attributes. The rule states how the assigned or associated or corresponding attribute value should be modified so it complies with the data protection conditions or the data protection directives. A rule of this kind can be, for example 'do not transfer', 'anonymize', 'pseudonymize', 'transfer unchanged' etc.

In the method step of first application APP-1, the rule, which is assigned to an attribute in the whitelist, is applied to the attribute value. The attribute value is assigned to the attribute from the whitelist via the data set. A modified attribute value is determined for the attribute by applying the rule. In the method step, each rule in the whitelist is applied to the corresponding attribute value. In this way, a modified attribute value is determined for each attribute in the first set of attributes.

In the method step of second determination DET-2, the minimized data set is determined. The minimized data set comprises the first set of attributes and the associated modified attribute values.

In the method step of third provision PROV-3, the minimized data set is provided for use outside of the central instance. In particular, the minimized data set is provided to the user U and/or the processing instance. Provision takes place via an interface. The minimized data set can be provided as a download and/or via a cloud.

In the illustrated example embodiment, the method steps of first application APP-1 of the rules, second determination DET-2 of the minimized data set and of third provision PROV-3 of the minimized data set are performed parallel to the method steps of first determination DET-1 and of second provision PROV-2.

FIG. 3 shows a flowchart of a third example embodiment of the method for dynamic data minimization of a data set for transfer of the minimized data set from a central instance to outside of the central instance.

The method steps of first provision PROV-1 of the whitelist, of first determination DET-1 of the attribute list and of second provision PROV-2 of the attribute list are performed analogously to the description according to FIG. 1.

The method steps of first application APP-1 of the rules, of second determination DET-2 of the minimized data set DET-2 and of third provision PROV-3 of the minimized data set are performed analogously to the description according to FIG. 2.

In this example embodiment, the method steps of first application APP-1 of the rules, of second determination DET-2 of the minimized data set and of third provision PROV-3 of the minimized data set are performed after second provision PROV-2 of the attribute list.

After second provision PROV-2 of the attribute list the user U and/or the processing instance W sends a signal that the method should be continued. In other words, the user U and/or the processing instance W signals continuation of the method. The signal can be, for example, a mouse click by the user U and/or a data flow of the processing instance W. The signal is identified in the Figure as a thick arrow. If no signal is given the method waits after second provision PROV-2 of the attribute list until a signal arrives.

Alternatively, the signal by the user U and/or the processing unit W can be omitted. When carrying out the method, the method step of first application APP-1 of the rules is then performed automatically after second provision PROV-2 of the attribute list. This means the method steps are performed in order without a signal from the outside. This also applies to all embodiments described below.

FIG. 4 shows a flowchart of a fourth example embodiment of the method for dynamic data minimization of a data set for transfer of the minimized data set from a central instance to outside of the central instance.

The method steps of first provision PROV-1 of the whitelist, of first determination DET-1 of the attribute list and of second provision PROV-2 of the attribute list are performed analogously to the description according to FIG. 1.

The method steps of first application APP-1 of the rules, of second determination DET-2 of the minimized data set DET-2 and of third provision PROV-3 of the minimized data set are performed analogously to the description according to FIG. 2.

In the method step of third determination DET-3, an actualized whitelist is determined based upon the attribute list. Third determination of the actualized whitelist can be performed by the user U and/or the processing instance W. With the knowledge from the attribute list as to which attributes are incorporated by the data set in addition to the attributes from the whitelist, the whitelist can be actualized. FIGS. 8 and 9 describe example embodiments of the method step of third determination DET-3 of the actualized whitelist in more detail.

The method steps of first provision PROV-1 of the whitelist, of first determination DET-1 of the attribute list, of second provision PROV-2 of the attribute list and of third determination DET-3 of the actualized whitelist can be carried out in a loop with N executed loops. N is a natural number. N can also be, in particular, one. In other words, the user U and/or the processing instance W can iteratively actualize the whitelist. The actualized whitelist is provided with each first provision PROV-1 of the whitelist.

Only when the user U and/or the processing instance W gives the signal is the most recent whitelist applied for minimization of the data set. Computing time can be saved as a result since the data set is only minimized when the user U and/or the processing instance W confirm the actualized whitelist, if the whitelist is adjusted for processing the minimized data set, therefore.

To speed up third determination DET-3 of the actualized whitelist the attributes, which are already known to the user U and/or the processing unit W, are marked with a marker. Such attributes are called known attributes. They can be, for example, attributes, which are already incorporated by the whitelist and/or which are known to the user U and/or the processing instance W in some other way. The marker can be, for example, the value '1', which is assigned to each attribute of the third set of attributes that is already known. All other attributes cannot be marked or can be marked, for example, with a '0'. Alternatively, all other attributes can be marked while the known attributes are not marked.

FIG. 5 shows a flowchart of a fifth example embodiment of the method for dynamic data minimization of a data set for transfer of the minimized data set from a central instance to outside of the central instance.

The method is performed substantially analogously to the example embodiment according to FIG. 3.

However, all method steps are performed in a loop. The loop can comprise N executed loops.

The loop can be performed N times for the same data set. Based upon the minimized data set and the attribute list the user U and/or the processing instance W can determine in the method step of third determination DET-3 an actualized whitelist, based upon which the minimized data set of the executed loop is determined.

Alternatively, the data set can have at least N individual files. The method steps are performed for the files as described for the preceding Figures in each individual executed loop. In the method step of third provision PROV-3, one minimized file is provided in each executed loop. The minimized file is determined as described above for the data set from the corresponding file of the executed loop.

In the method step of first determination DET-1 of the attribute list, the attribute list of the previous executed loop is actualized in each executed loop. The attributes, which are incorporated by the second set of attributes of the file of the executed loops, but which have not yet occurred in the attribute list, are included in the attribute list in this case. In particular, the attribute list can comprise a frequency value for each attribute of the third set of attributes. The frequency value describes the occurrence frequency of an attribute from the third set of attributes totaled over the executed loops. Each time the attribute in an executed loop is incorporated by the first set of attributes, the frequency value of the corresponding attribute in the attribute list is increased by one. In addition, each attribute in the attribute list can be marked as described above if it was already incorporated by the attribute list in a previous executed loop.

FIG. 6 shows a flowchart of a sixth example embodiment of the method for dynamic data minimization of a data set for transfer of the minimized data set from a central instance to outside of the central instance.

The method is performed substantially analogously to the example embodiment according to FIG. 5.

After the method step of third determination DET-3 of the actualized whitelist the user U and/or the processing instance W can decide, as in the example embodiment according to FIG. 4, whether the method steps of first provision PROV-1 of the whitelist, of first determination DET-1 of the attribute list, of second provision PROV-2 of the attribute list and of third determination DET-3 of the actualized whitelist should be performed once again for the file or the data set of the executed loop or whether the method should be continued with the actualized whitelist.

FIG. 7 shows a flowchart of a seventh example embodiment of the method for dynamic data minimization of a data set for transfer of the minimized data set from a central instance to outside of the central instance.

The method steps are performed as described above. The loop can either be performed for a data set N times or for N files of the data set.

The method step of third determination DET-3 of the actualized whitelist is not performed in each executed loop. The method step of third determination DET-3 of the actualized whitelist is only performed if the step is initiated by a trigger. The trigger can activate, for example, as a function of time, as a function of the number of attributes in the corresponding executed loop and/or as a function of the frequency values in the attribute list. The trigger can activate, in particular, a trigger signal. The trigger signal can visually or acoustically signal to the user U that a check step has to be performed. Alternatively, the trigger signal can be a data signal for the processing instance W so this performs the check step. In the check step, the user U and/or the processing instance W checks based upon the attribute list whether the method step of third determination DET-3 of the actualized whitelist should be performed. Depending on this decision the procedure continues either with the method step of third determination DET-3 of the actualized whitelist or with the method step of first application APP-1 of the rules. After third determination DET-3 of the actualized whitelist the user U and/or the processing instance W can signal that the procedure should be continued with the method step of first application APP-1 of the rules.

Alternatively, analogously to the example embodiment according to FIG. 6, a further decision loop can be built in after third determination DET-3 of the actualized whitelist. In the decision loop, a decision is made after third determination DET-3 of the actualized whitelist as to whether the method should be continued or whether the method steps of first provision PROV-1 of the whitelist, of first determination DET-1 of the attribute list, of second provision PROV-2 of the attribute list and of third determination DET-3 of the actualized whitelist should be carried out again in the same executed loop for the same file or the same data set.

FIG. 8 shows a flowchart of a first example embodiment of the method step of third determination of the actualized whitelist.

In the illustrated example embodiment, the method step of third determination DET-3 of the actualized whitelist comprises the method step of first actualization ACT-1 of the whitelist and the optional method step of first deletion DEL-1 of the attribute added to the whitelist from the attribute list.

In the method step of first actualization ACT-1, an attribute from the attribute list is added to the whitelist. In the preceding check step, the user U and/or the processing instance W decide that at least one attribute from the attribute list should be added to the whitelist. The at least one attribute is added to the whitelist. In addition, a rule is added for each attribute added to the whitelist. This rule can be determined, for example, by the user U according to the data protection directives. Alternatively, the rule can be automatically determined by the processing instance W.

In the optional method step of first deletion DEL-1, the at least one attribute, which was added to the whitelist in the method step of first actualization ACT-1 of the whitelist, is deleted from the attribute list. The method step can be performed in order to avoid redundant information in different lists and to ensure better clarity for the user U and/or the processing instance W.

Alternatively, the at least one attribute can be retained in the attribute list and be marked with a marker. The marker shows the user U and/or the processing instance W that the attribute has already been included in the whitelist and does not need to be checked again.

FIG. 9 shows a flowchart of a second example embodiment of the method step of third determination of the actualized whitelist.

In this example embodiment, third determination DET-3 of the actualized whitelist can be performed at least partially automatically by the processing instance W.

In the method step of fourth determination DET-4, it is determined whether an attribute of the attribute list is unknown to the user U and/or the processing instance W. For this, it is possible to check, for example, whether at least one attribute without marker is incorporated by the attribute list. In particular, all attributes of the attribute list, which are already incorporated by the whitelist and which were already part of the attribute list in a previous executed loop, are marked for this. If the check step is not performed in each executed loop, the attributes, which are incorporated by the whitelist, and the attributes, which were already incorporated by the attribute list during a previous check step, are marked. Unmarked attributes are assumed to be or classified as unknown, therefore.

In the method step of fifth determination DET-5 of a data format, the data format of the attribute value of the unknown attribute is determined. For this, the unknown attribute is sought in the second set of attributes. An attribute value is assigned to each attribute of the second set of attributes of the data set. The data format of the associated attribute value is determined based upon the data set. The data format can be, for example, a date format, a currency format, a numerical format, a string format, etc.

In the method step of first checking CHECK-1, a check is made as to whether an attribute, to which by way of the data set an attribute value can be assigned with the same data format as the data format of the attribute value of the unknown attribute, is incorporated by the whitelist. An attribute of this kind is referred to as a matching attribute. In particular, no attributes, one or more than one matching attribute can be found in the attribute list during checking. Assigned to each attribute in the whitelist is a rule with which the associated attribute value is modified in such a way that the attribute value correspond with the data protection directives.

Following the method step of first checking CHECK-1, the procedure is continued depending on the result of the check step.

If no matching attribute is found, the procedure continues with the method step, which follows the method step of third determination DET-3 of the actualized whitelist.

If a matching attribute is determined in the attribute list, the unknown attribute can be added with the rule of the matching attribute from the whitelist to the whitelist. This is performed in the step of second actualization ACT-2 of the whitelist.

If more than one matching attribute is determined, with different rules being assigned to the matching attributes in the whitelist, the rule, which modifies the attribute value the most, is added together with the unknown attribute to the whitelist. For this, the rules can be divided into in classes, which describe the degree of modification of the attribute value. Slightly modified means that the attribute value is not changed by applying the rule. Greatly modified means that the attribute value is deleted by applying the rule. If the rule with the greatest modification is assigned to the unknown attribute, the risk that too much data is transferred to outside of the central instance can be reduced. Alternatively, the different rules can be presented to the user U who decides manually which of the rules should be assigned to the unknown attribute. The unknown attribute and the rule assigned in this way are added to the whitelist in the method step of second actualization ACT-2. In particular, the unknown attribute is added to the first set. The method step of second actualization ACT-2 of the whitelist can be performed for more than one unknown attribute.

Analogously to the description of the method step of first deletion DEL-1 according to FIG. 8, the unknown attribute can be deleted in the method step of second deletion DEL-2 from the attribute list or the third set of attributes. This method step can be performed optionally.

The method steps of fourth determination DET-4, of fifth determination DET-5 of the data format, of first checking CHECK-1, of second actualization ACT-2 of the whitelist and optionally of second deletion DEL-2 of the unknown attribute can be performed in particular by the processing instance W.

If no matching attribute is found in the method step of first checking CHECK-1, the method step of third actualization ACT-3 of the whitelist and optionally of third deletion DEL-3 of the unknown attribute is performed manually by the user U.

In this case, the user U determines in the method step of third actualization ACT-3 of the whitelist a rule for the unknown attribute. The unknown attribute is then added together with the rule to the whitelist. In particular, the unknown attribute is added to the first set.

In the optional method step of third deletion DEL-3 of the unknown attribute, analogously to the method steps of first deletion DEL-1 and of second deletion DEL-2, the unknown attribute can be deleted from the attribute list or from the third set of attributes.

FIG. 10 shows a data minimization apparatus 10 for dynamic data minimization of a data set for transfer of the minimized data set from a central instance to outside of the central instance. The data minimization apparatus 10 shown here is configured to perform an inventive method. This data minimization apparatus 10 comprises an interface 11, a computing unit 12, a memory unit 13 and an input and output unit 14. The interface 11 can comprise, in particular, further interfaces or sub-interfaces. Furthermore, the computing unit 12 can comprise, in particular, further computing units or sub-computing units.

The data minimization apparatus 10 can be, in particular, a computer, a microcontroller or an integrated circuit. Alternatively, the data minimization apparatus 10 can be a real or virtual group of computers (an English technical term for a real groups is "cluster", an English technical term for a virtual group is "cloud").

An interface 11 can be a hardware or software interface (for example PCI bus, USB or Firewire). A computing unit 12 can have hardware elements or software elements, for example a microprocessor or what is known as an FPGA ("Field Programmable Gate Array"). A memory unit 13 can be implemented as a Random Access Memory (RAM for short) or as a permanent bulk memory (hard disk, USB stick, SD card, Solid State Disk). An input and output unit 14 comprises at least one input unit and/or at least one output unit.

An input unit 14 can be implemented, in particular, via a keyboard and/or a mouse. An output unit 14 can be, in particular, a screen. Alternatively, it can also be a printer, which is designed to print out image data.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for dynamic data minimization of a data set for transfer of a minimized data set from a central instance to outside of the central instance, the data set including a second set of attributes, the method comprising:
provisioning a whitelist, the whitelist including a first set of attributes, the first set of attributes being a subset of the second set of attributes and the minimized data set including the first set of attributes, each attribute of the second set of attributes being assigned on attribute value;
determining an attribute list including a third set of attributes, the third set of attributes including at least each attribute of the second set of attributes not included in the whitelist;
provisioning the attribute list by the central instance for use outside of the central instance; and
determining, in response to a trigger that is time-controlled, an actualized whitelist based on the attribute list, the determining the actualized whitelist including,
determining an unknown attribute in the attribute list, the unknown attribute being unknown to at least one of a user or a processing instance,
determining a first date format of the attribute value of the unknown attribute,
checking for a matching attribute in the first set of attributes, the attribute value of the matching attribute having the first data format, and
actualizing the whitelist based on the checking, the actualizing the whitelist including, in response to the first set of attributes having no matching attribute,
creating an associated rule for the unknown attribute, and
adding the unknown attribute and the associated rule to the whitelist.

2. The method of claim 1, wherein the whitelist includes at least one rule for each attribute of the first set of attributes, the method further comprising:
applying the at least one rule to the attribute value of the respective attribute of the first set of attributes;
determining a respective modified attribute value for each respective attribute of the first set of attributes;
determining the minimized data set, the minimized data set including the first set of attributes and the respective modified attribute value for each respective attribute of the first set of the attributes; and
provisioning the minimized data set by the central instance for use outside of the central instance.

3. The method of claim 2, wherein the method is performed in response to confirming at least one of (i) the whitelist, (ii) the actualized whitelist, or (iii) a processing instance.

4. The method of claim 2, wherein the attribute list includes a respective frequency value for each respective attribute of the third set of attributes, the respective frequency value indicating an occurrence frequency of the respective attribute in the data set.

5. The method of claim 1, wherein
the data set includes a plurality of individual files, and
the provisioning the whitelist, the determining the attribute list, and the provisioning the attribute list are performed for the plurality of individual files in a loop, the loop including at least one executed loop performed for one respective file of the plurality of individual files such that the one respective file is minimized, the at least one executed loop including adjusting the attribute list to the respective file of the executed loop.

6. The method of claim 5, wherein the attribute list includes a first marker for each respective attribute of a first subset of the third set of attributes, the first marker indicating whether the respective attribute is included in the third set of attributes.

7. The method of claim 6, wherein the attribute list includes a second marker for each respective attribute of a second subset of the third set of attributes, the second marker indicating whether the respective attribute is included in the whitelist.

8. The method of claim 1, wherein the attribute list includes a respective frequency value for each respective attribute of the third set of attributes, the respective frequency value indicating an occurrence frequency of the respective attribute in the data set.

9. The method of claim 1, wherein the determining the whitelist includes,
adding an attribute from the attribute list to the whitelist.

10. The method of claim 9, wherein the determining the actualized whitelist includes,
deleting the attribute added to the whitelist from the attribute list.

11. The method of claim 1, wherein the trigger is manually initiated.

12. The method of claim 11, wherein the trigger is controlled by the number of attributes in the third set of attributes.

13. The method of claim 1, further comprising:
deleting the unknown attribute from the attribute list.

14. A non-transitory computer-readable storage medium storing program segments, readable and executable by a data minimization apparatus, to perform the method of claim 1 when the program segments are executed by the data minimization apparatus.

15. The method of claim 1, wherein the determining the actualized whitelist is based on at least one of,
a number of attributes in the attribute list,
a user input in relation to an attribute in the attribute list, or
a rule in relation to the attribute list.

16. A data minimization apparatus for dynamic data minimization of a data set and for transfer of a minimized data set from a central instance to outside of the central instance, the data set including a second set of individual attributes, the data minimization apparatus comprising:
a processor configured to cause the data minimization device to,
provision a whitelist, the whitelist including a first set of attributes, the first set of attributes being a subset of a second set of attributes, and the minimized data set including the first set of attributes, each attribute of the second set of attributes being assigned an attribute value,
determine an attribute list including a third set of attributes, the third set of attributes including at least each attribute of the second set of attributes not included in the whitelist,
provision the attribute list by the central instance for use outside of the central instance, and
determine, in response to a time-controlled trigger, an actualized whitelist based on the attribute list by determining an unknown attribute in the attribute list, the unknown attribute being unknown to at least one of a user or a processing instance, determining a first data format of the attribute value of the unknown attribute, checking for a matching attribute in the first set of attributes, the attribute value of the matching attribute having the first data format, and actualizing the whitelist based on the checking, the actualizing the whitelist including, in response to the first set of attributes having no matching attribute, creating an associated rule for the unknown attribute in response to the first set of attributes having no matching attribute, and adding the unknown attribute and the associated rule to the whitelist.

\* \* \* \* \*